| United States Patent [19] | [11] Patent Number: 4,554,090 |
| Jones | [45] Date of Patent: Nov. 19, 1985 |

[54] COMBINATION CORROSION/SCALE INHIBITOR

[76] Inventor: Loyd W. Jones, P.O. Box 9917, Tulsa, Okla. 74107

[21] Appl. No.: 587,494

[22] Filed: Mar. 9, 1984

[51] Int. Cl.$^4$ .............................................. C02C 5/02
[52] U.S. Cl. .................................. 252/181; 252/147; 252/148; 252/180; 252/8.55 E; 252/389 R; 252/394
[58] Field of Search ............... 252/147, 148, 180, 181, 252/8.55 E, 389.2, 394; 260/502.5 R

[56] References Cited

U.S. PATENT DOCUMENTS 2,468,163  4/1949  Blair, Jr. et al. ............... 252/8.55 E
2,472,400  6/1949  Bond et al. ..................... 252/8.55 E
3,803,047  4/1974  Hwa ............................... 252/8.55 E
4,243,591  1/1981  Magin ............................. 252/180

*Primary Examiner*—Paul Lieberman
*Assistant Examiner*—John F. McNally
*Attorney, Agent, or Firm*—Head, Johnson & Stevenson

[57] ABSTRACT

A combination corrosion and scale inhibitor composition comprising the reaction product of a heterocyclic nitrogen containing compound (e.g., mixtures of alkyl substituted pyridines) and aldehyde (e.g., formaldehyde) and a phosphoric acid constituent (e.g., phosphoric acid or phosphonic acid). Such compositions exhibit, simultaneously, inhibition to oxidation corrosion (rusting of carbon steel); suppression of sulfide corrosion ($H_2S$ in NaCl brine) and the prevention of mineral scaling ($CaCO_3$ and $CaSO_4$ scale precipitation).

10 Claims, No Drawings

COMBINATION CORROSION/SCALE INHIBITOR

BACKGROUND OF THE INVENTION

1. Field of the Invention:

This invention relates to novel compositions which exhibit both corrosion and scale inhibition. More specifically, this invention relates to a combined corrosion and scale inhibitor synthesized from the reaction of a heterocyclic nitrogen containing compound with an aldehyde and phosphorus acid constituent.

2. Description of the Prior Art:

It is generally recognized and widely known that both metal corrosion and mineral scale deposition are serious operational problems in many industries and are particularly severe in the oil and gas producing, refining and transportation industry. By far, most internal corrosion of metal equipment occurs in the presence of liquid water, even in systems handling primarily hydrocarbons. Corrosion attack results most often from chemical reactions of the metal with oxygen, hydrogen sulfide and carbon dioxide dissolved in the water. Certain salts and minerals also present in the water contribute to the corrosion process. Some dissolved mineral constituents, specifically calcium, barium, strontium, bicarbonate, carbonate and sulfate ions, also react to form troublesome mineral scales that clog the tubulars and process vessels and impede heat transfer. The combined costs from equipment replacement, repair, cleaning and downtime caused by corrosion and scaling in the United States can be measured in terms of billions of dollars each year. Such costs are kept at acceptable levels by several techniques, including additions of chemical inhibitors which slow the corrosion attack and scale accumulation. Unfortunately, most corrosion inhibitors such as the organic amines are not effective as scale inhibitors. Conversely, most scale inhibitors, such as the various phosphorus containing chemicals (phosphates, phosphonates and phosphate esters) are not effective alone in preventing corrosion, especially that caused by hydrogen sulfide and carbon dioxide. Consequently, it is common practice to apply at least two types of inhibitors to systems effected by both corrosion and scale. The individual corrosion and scale inhibitors generally have to be applied separately for best control and effectiveness. Thus, many attempts have been made to create a single inhibitor composition to control both scaling and corrosion conditions with a single treatment.

For example, U.S. Pat. No. 3,770,815 describes one such composition that is oil soluble. However, these previous dual purpose compositions have not adequately solved the problem and the so-called "combination" corrosion/scale inhibitors are used to a relatively limited extent, in that they make up only a small fraction of the total inhibitor sales. A particularly severe shortcoming of most combination corrosion/scale inhibitors currently available is that they are not capable of adequately preventing the severe corrosion which results from the simultaneous presence of oxygen and hydrogen sulfide. This is essentially an unsolved problem in the oil field water systems handling sour brines that are contaminated by atmospheric oxygen. Further, the presently available combination inhibitor products are almost universally less effective at equal concentrations than are the commercial single purpose scale inhibitors and therefore, must be used at higher treating levels.

The present invention provides in a single chemical composition a water soluble inhibitor that is highly effective in preventing corrosion by oxygen and hydrogen sulfide, either singularly or in combination, and which is equivalent in scale inhibiting efficiency to the single purpose scale inhibitors now used.

SUMMARY OF THE INVENTION

In view of the previous problems associated with simultaneous inhibition of both corrosion and scale, I have developed a combination corrosion and scale inhibitor composition comprising the reaction product of:

(a) a heterocyclic nitrogen containing compound selected from the group consisting of alkyl substituted pyridine, alkyl substituted pyrimidine, alkyl substituted imidazole, alkyl substituted imidazoline, quinoline, quinaldine and mixtures thereof, wherein the alkyl substitution comprises at least one alkyl group of one to about six carbon atoms;

(b) an aldehyde selected from the group consisting of formaldehyde, benzaldehyde, furfural and mixtures thereof; and (c) a phosphorus acid constituent selected from the group consisting of phosphoric acid, polyphosphoric acid, $P_2O_5$, phosphonic acid, acidic phosphate esters of amino alcohols, ethoxylated amines, and alkanol amines and mixtures thereof.

Thus, the present invention broadly involves a five to ten membered heterocyclic organic compound containing at least one tertiary nitrogen in the ring, the aldehyde is generally of the formula RCHO, where R euqals —H, $C_6H_5$— or

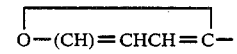

and alkyl derivatives of the latter two cyclic structures and the phosphorus acid is generally any acidic compound with phosphorus in the +5 valence state. In one preferred embodiment of the present invention an alkyl substituted pyridine or mixture thereof is reacted with formaldehyde and either polyphosphoric acid or a phosphonic acid. Preferably, the reaction is performed with at least about one mole of aldehyde and about one mole of phosphorus acid constituent per mole of heterocyclic nitrogen containing compound.

It is an object of the present invention to provide a water soluble inhibitor composition that exhibits the combination of inhibition to oxidation corrosion, suppression of sulfide and carbon dioxide and the prevention of mineral scaling. It is a further object of the present invention to provide a method of synthexizing the combination corrosion and scale inhibitor composition. Fulfillment of these objects and the presence and fulfillment of other objects will be apparent upon complete reading of the specification and attached claims.

DESCRIPTION OF THE PREFERRED EMBODIMENT

The novel corrosion/scale inhibitor compositions and the method of making the same according to the present invention can perhaps best be explained and understood by reference to specific examples illustrating the synthesis of representative compositions and the corresponding evaluation of the corrosion/scale inhibiting properties. As previously indicated, the combined corrosion/scale inhibitors according to the present invention are the reaction products of a heterocyclic nitrogen containing compound, and aldehyde and phosphorus acid constituents. The reaction is preferably carried out by blending the concentrated reactants at atmospheric pressure with or without additional heating to initiate or assist the otherwise exothermic reaction. Preferably the reactants are present in essentially equal molar quantities based on the moles of the heterocyclic nitrogen containing reactant. In other words, at least about one mole of aldehyde and about one mole of phosphorus acid constituent are added per mole of nitrogen containing alkyl pyridine or the equivalent. In the case of the use of a phosphonic acid, phosphate ester or other polyphosphoric acid constituent the preferred stoichiometric quantity of phosphorus acid to be used should be based on the phosphoric acid equivalent, i.e., one equivalent of acid per mole of heterocyclic nitrogen compound. It should also be appreciated that some excess of either or both of the aldehyde and phosphorus acid constituent is acceptable in that residual unreacted reactant is not deleterious but such is not felt to be necessary for purposes of this invention.

The following examples are presented to illustrate typical and preferred compositions according to the present invention, their method of synthesis and the resulting desired corrosion/scale inhibiting properties.

EXAMPLE I

To 18.0 grams of a commercially available alkyl pyridine mixture derived as a one-to-one mixture of distillate and residue byproducts from the continuous catalytic production and distillation of 2-methyl-5-ethyl pyridine and sold by Lonza, Inc., under the trade name Alkolidine 11 having an average molecular weight of about 180 and a pyridine base distribution for the distillate as follows:

| | |
|---|---|
| 5-(transbutenyl-2)-2-picoline | 20% |
| 3,5-diethyl-2-picoline | 10% |
| 3-ethyl-4-methyl-pyridine | 5% |
| 2-(propenyl-1)-5-ethyl-pyridine | 5% |
| 5-(3-aza-pentyl)-2-picoline | 5% | was added to 9.2 grams (slight excess) of 37% commercial grade formaldehyde solution and 17.1 grams of commercial grade 115% polyphosphoric acid. No reaction was apparent between the alkyl pyridine and formaldehyde until introduction of the polyphosphoric acid whereupon the mixture became very hot, the viscosity increased and the mixture became clear and uniform. The exothermic reaction was allowed to proceed to completion.

EXAMPLE II

In order to prepare a field strength inhibitor material, 20 grams of the reaction product of EXAMPLE I was blended with 5 grams of a 9.5 mole ethylene oxide adduct of nonylphenol surfactant (Jefferson Chemical Company, Surfonic N95), 10 grams of water and 10 grams of methyl alcohol. The resulting solution was bright and stable and did not separate nor congeal on storage at freezing temperatures. Qualitative screening tests for inhibition of oxygen corrosion (rusting) of carbon steel coupons immersed in 5% NaCl brine exposed to air, showed a high degree of effectiveness at least equal to rust inhibitors such as inorganic chromates and phosphates. Comparative screening of the field strength product for suppression of steel corrosion by $H_2S$ in NaCl brine indicated the product is also surprisingly effective for this purpose compared with the rust inhibitors and approaches the performance of commercially available oilfield $H_2S$ corrosion inhibitors. Further, the field strength product was shown by laboratory tests to have a useful ability to prevent precipitation of $CaCO_3$ and $CaSO_4$ scales, being about 50% as effective as the single purpose commercial scale inhibitors. Collectively, the test data indicate the field strength product has the ability to simultaneously retard oxidation corrosion, sulfide (sour) corrosion and mineral scaling well beyond that provided by any known commercial inhibitor product and categorically mitigated all three problems with a single composition.

EXAMPLE III

To 18.0 grams of alkyl pyridine mixture, Alkolidine 11, was added 8.0 grams of 37% formaldehyde solution and 17.0 grams of a 50% active amino pentamethylene phosphonic acid sold under the trade name IS 32A by Chemical Manufacturing Exchange, Inc. (CME). Upon mixing of the reactants the exothermic reaction proceeded somewhat less vigorously than the previous polyphosphoric acid reaction with a temperature rise to about 120° F. The solution cleared substantially and showed no evidence of component separation. The solution was then heated on a hot plate to about 160° to 170° F. with apparent vapors of $CH_2O$ and $H_2O$ being liberated. The temperature was then elevated to about 170° to 180° F. for the next 15 minutes. After 30 minutes at the elevated temperature the solution became thicker and brighter but was still slightly hazy. At 45 minutes the solution was much thicker and brighter with only a trace of vapor emission. The reaction product was allowed to cool, producing a bright homogeneous solution with an overall weight loss of 9.3 grams during synthesis. Weight loss apparently resulted from evaporation of water contained in the original reactants. The reaction product produced a muddy dispersion when diluted with water but easily cleared upon addition of a 9.5 mole ethylene oxide nonylphenol surfactant producing a clear stable solution with a pH in the range of 5 to 6.

EXAMPLE IV

In a manner analagous to EXAMPLE III, 18.0 grams of Alkolidine 11, 8.6 grams of 37% solution of formaldehyde and 23.0 grams of CME's IS 32A (50% active) phosphonic acid were placed in a 200 ml beaker and stirred. The exotherm raised the temperature from about 70° F. to 120° F. almost immediately providing a nearly clear solution. One gram of 9.5 mole ethylene oxide nonylphenol surfactant (Jefferson Chemical Company's Surfonic N-95) was initially added producing a clear to slightly hazy solution. The addition of 0.5 grams more of N-95 resulted in a bright, clear, dark amber viscous solution. The exothermic reaction kept the temperature at 80° F. for about 20 minutes following addition of the solubilizing surfactant, after which 25 ml of Tulsa tap water was added producing a bright, stable solution. The solution was then diluted further by addition of 10 more milliliters of the water and 19 milliliters (15 grams) of methyl alcohol. The final solution was clear, bright and water soluble. Storing the solution in a freezer overnight did not induce any phase separation or any apparent viscosity increase.

EXAMPLE V

In order to illustrate the use of mixed phosphorus acid constituents, a sequential addition and reaction of polyphosphoric acid followed by a phosphonic acid was performed as follows: To 18.0 grams of Alkolidine 11 was added 8.2 grams of 37% formaldehyde solution and 5.0 grams of 115% polyphosphoric acid. Upon stirring, the reaction temperature climbed from 70° F. to 120° F. and the solution became brighter, more clear and viscous. Upon cooling to near room temperature, 20 grams of CME's IS 32A amino pentamethylene phosphonic acid was added as a second source of phosphorus acid. A second exotherm resulted in a temperature rise of 72° F. to 88° F. producing a very bright but slightly hazy solution. 1.5 grams of surfactant N-95 was added as a dispersant solubilizer. In a manner analagous to Example IV, the reaction product was diluted with 35 ml of tap water and 19 ml of methanol. With stirring the final blend was clear, bright and homogeneous.

EXAMPLE VI

In order to demonstrate and evaluate the oxidation corrosion inhibiting property of the compositions according to the present invention, a 2% NaCl solution was prepared by dissolving 20 grams of NaCl in 1 liter of Tulsa tap water. A 200 ml aliquot of the 2% NaCl solution was placed in each of five 250 ml beakers and a steel test coupon was suspended in each beaker. The test coupons were made from C75 oil field grade tubing steel by cutting approximately $1'' \times 1'' \times \frac{1}{4}''$ pieces which were then thoroughly cleaned. The cleaning process involved glass bead blasting followed by immersion in 15% HCl acid, water rinsing and alcohol drying. As indicated in Table I, the five beakers contained varying concentration of inhibitor with beaker 1 being a control (no inhibitor) and the other beakers having either the composition of Example IV or V at concentrations of either 50 or 250 mg per liter.

TABLE I

| Beaker No. | Inhibitor | Concentration (mg/l) |
|---|---|---|
| 1 | None | — |
| 2 | EXAMPLE IV | 50 |
| 3 | EXAMPLE IV | 250 |
| 4 | EXAMPLE V | 50 |
| 5 | EXAMPLE V | 250 |

The beakers with the suspended steel coupons were allowed to stand at ambient conditions for two days while observations as to the rate of corrosion (rusting) were periodically made. After 24 hours of exposure, the coupon in the noninhibited 2% NaCl solution (the control beaker 1) was coated with fluffy rust and free rust covered the bottom of the beaker. Beakers 2 and 4 having 50 mg/l inhibitor showed traces of rust on the top edge of the coupon only and no loose rust was present in either beaker. Beakers 3 and 5 showed no evidence of rust. The metal coupons showed only a dark gray coating with a metal sheen.

After 48 hours of contact the control beaker 1 was rusting heavily with a heavy layer of hydrated iron oxide on the bottom of the beaker. Again the test coupons of beakers 2 and 4 showed traces of rust especially on the top edges of the test coupons with traces of iron oxide on the bottom of the beaker (less than 5% coverage of the bottom). The coupons of beakers 3 and 5 showed only very small traces of rust on the top edges of the coupons with no apparent iron oxide in the beakers. From the above, it was concluded that the compositions of EXAMPLE IV and V are effective as rust inhibitors. The obvious degree of inhibition is comparable to that produced by equivalent concentrations of the well known rust inhibitor sodium chromate. It is known from prior tests that sodium chromate and other well known rust inhibitors do not perform well as inhibitors for $H_2S$ corrosion, nor as scale inhibitors.

EXAMPLE VII

In order to demonstrate and evaluate the sulfide ($H_2S$) corrosion inhibiting property of the compositions according to the present invention, the following ingredients were added to each of three one liter Florence flasks as follows:
50 grams NaCl
4.3 grams $Na_2S \cdot 9H_2O$
0.2 grams $Na_2SO_3$
4.0 ml of 99% glacial acetic acid
1000 ml Tulsa tap $H_2O$ The solution was turbid at first (elemental sulfur) with a strong odor of $H_2S$ (pH<5). Using rubber stoppers and glass hooks a $1'' \times 1'' \times 1/16''$ metal coupon made of 1010-1020 mild steel was suspended in each solution. The mild steel coupons had been previously cleaned by belt sanding, detergent washing, acid flushing, water and alcohol rinsing. The dried coupons were weighed before and after exposure for $5\frac{3}{4}$ days to the corrosive sour brine described above. A summary of test results is presented in Table II. The first Florence flask contained no inhibitor (control), the second flask contained 0.2 ml of 10% solution of the composition of Example IV (approximately 20 ppm inhibitor) and the third flask contained 0.5 ml of the 10% solution of the composition of Example IV (approximately 50 ppm inhibitor). The coupons remained suspended in the solution for approximately $5\frac{3}{4}$ days at essentially ambient temperature after which they were recovered, cleaned, dried and reweighed. The percent inhibition was calculated as the relative decrease in weight loss compared to the control (e.g., $(339-12/339) \times 100 = 96.5$). The rate of corrosion was calculated in terms of mils of penetration per year (e.g., $0.339 \times 2831/2 \times 5.75 = 8.3$).

TABLE II

| Flask | Inhibitor Conc. | Weight of Coupon Before | Weight of Coupon After | % Inhibition | Rate of Corrosion |
|---|---|---|---|---|---|
| 1 | None | 4.5141 | 4.4802 | — | 8.3 |
| 2 | Example IV (20 ppm) | 4.3108 | 4.3096 | 96.5 | 0.3 |
| 3 | Example IV (50 ppm) | 4.4592 | 4.4580 | 96.5 | 0.3 |

The mild steel coupon in flask 1 (the control) etched and blistered during the testing. The heavy blistering on this test coupon is known to be characteristic of $H_2S$ corrosion that is often encountered in tanks handling very corrosive sour fluids in oil field and refinery applications. Although the untreated (uninhibited control) corrosion rate of 8.3 mls per year is relatively high compared with long term corrosion rates in oil field tubulars exposed to air free sour salt water, it is felt to be definitely realist of severe $H_2S$ corrosion when traces of oxygen are present. The loss of weight (0.0012 grams) for flasks 2 and 3 were considered largely due to the scouring and acid treatment during final cleaning of the coupons and corrosion weight loss was essentially nil. Only the coupon of flask 3 showed slight pitting with traces of FeS in the pits. The resulting 96.5% inhibition and 0.3 mils/year corrosion rate are considered to be very good compared to commercial inhibitors which the inventor has previously tested using similar test conditions (e.g., see proposed standard test method by NACE, *Corrosion*, Vol. II, pages 143f, March, 1965). From the above it was concluded that the inhibitor compositions according to the present invention are effective for controlling both $H_2S$ and $O_2$ corrosion.

EXAMPLE VIII

To further demonstrate and evaluate the sulfide corrosion inhibition, a set of four experimental samples plus a control were tested according to the static bottle test (NACE procedure of Example VII) except the pH in this series was nearly neutral (no acetic acid). $H_2S$ was added to the NaCl test brine by bubbling $H_2S$ gas through the solution until a dissolved concentration of 500 ppm was reached. Again, a series of five 1"×1"×1/16" coupons of 1010–1020 sheet steel were suspended in 5 wt% NaCl solution in the presence of $H_2S$ for seven days. Two of the test samples had 12.5 ppm of the composition of Example IV added while the other two samples had 25 ppm of the same inhibitor present. The data presented in Table III represents the average value of two test specimens.

TABLE III

| Flask | Inhibitor Conc. | Coupon Wt. Loss | % Inhibition |
| --- | --- | --- | --- |
| Control | None | 0.0294 | — |
| 1 | 12.5 ppm | 0.0022 | 92.7 |
| 2 | 25 ppm | 0.0017 | 94.2 |

From the data it was concluded that the compositions tested exhibited excellent inhibition for $H_2S$ corrosion.

EXAMPLE IX

Using the published NACE test method TM-03-74 for mineral scale inhibition efficiency the inhibitor composition of Example IV was tested for prevention of $CaCO_3$ and $CaSO_4$ scale precipitation. TABLE IV summarizes the results of the $CaCO_3$ scale tests at two concentrations of inhibitor (5 and 10 mg/1) and in the absence of inhibitor (control). Table V summarizes the results of $CaSO_4$ scale tests at two low treating levels (2 and 5 mg/1) and two high treating levels (10 and 20 mg/1) again relative to a control without inhibitor.

TABLE IV

| Inhibitor Conc. mg/l | Wt. $CaCO_3$ ppt. from 400 ml test soln. | % Inhibition |
| --- | --- | --- |
| None (control) | 0.1884 (avg. 2 runs) | — |
| 5 | 0.0638 (avg. 2 runs) | 66.1 |
| 10 | 0.0422 (avg. 2 runs) | 77.6 |

TABLE V

| Inhibitor Conc. mg/l | Wt. of $CaCO_4$ ppt. from 200 ml test soln. | % Inhibition |
| --- | --- | --- |
| $CaSO_4$ Scale - Loading (6000 ppm $CaSO_4$) | | |
| None (control) | 0.3202 g (avg. 2 runs) | — |
| 2 | 0.0018 g (avg. 2 runs) | 99.4 |
| 5 | 0.0009 g (avg. 2 runs) | 99.7 |
| $CaSO_4$ Scale - High Loading (10,000 ppm $CaSO_4$) | | |
| None (control) | 0.3202 (avg. 2 runs) | — |

TABLE V-continued

| Inhibitor Conc. mg/l | Wt. of $CaCO_4$ ppt. from 200 ml test soln. | % Inhibition |
| --- | --- | --- |
| 10 | 0.4133 (avg. 2 runs) | 57.8 |
| 20 | 0.0039 (avg. 2 runs) | 99.6 |

In view of the above data, it was concluded that the compositions according to the present invention exhibit good performance as $CaCO_3$ scale inhibitors and excellent performance as $CaCO_4$ scale inhibitors. Results are comparable to commercial scale inhibitors (such as CME IS 32A alone) in the same test. The commercial scale inhibitors are not effective as corrosion inhibitors in $H_2S$ and $CO_2$ environments.

EXAMPLE X

In order to illustrate use of a variety of alky pyridines in the present invention, three separate batches of inhibitor composition were prepared in a manner similar to the procedures employed in Examples I, III, IV and V except that in two of the new batches Akolidines 10 and 12 were employed instead of Akolidine 11 as used in the previous examples. Akolidine 10 differs from Akolidine 11 in that the 10 product is essentially pure distillate as described under Example I. Akolidine 11 and 12 contain about 50% and 66%, respectively, of still residue from the manufacture of 2-methyl-5-ethyl pyridine in addition to the distillate and thus are richer in heavier, higher, boiling alkyl pyridines and associated products. The typical equivalent molecular weights of the three grades of alkyl pyridines are as follows:

| | | |
| --- | --- | --- |
| Akolidine | 10 | 169 average molecular weight |
| Akolidine | 11 | 180 average molecular weight |
| Akolidine | 12 | 190 average molecular weight |

To prepare the three new batches of inhibitor composition, approximately 1/10th of 1 gram mole of each Alkolidine was weighed in three individual beakers. To each beaker was then added 8.2 grams of 37% formaldehyde and 23.0 grams CME IS 32A phosphonic acid (representing approximately 1/10th of 1 gram mole equivalent of the aldehyde and the phosphonic acid). The mixtures were stirred and the exothermic reaction of each were allowed to go to completion (about 30 minutes lapsed time). To each beaker was then added 1.5 gram of Surfonic N95 surfactant, 35.0 grams of water and 15.0 grams of methyl alcohol. The water and alcohol were premixed prior to addition in each case to avoid precipitation of the primary reaction product. The final solutions were bright and stable, except the one containing the Akolidine 10 possessed a definite haziness. Side tests showed the haziness could be removed to produce a totally clear solution by the addition of a little extra Surfonic N95 to the Akolidine 10 product. This was not done, however, since it was desirable to keep all three compositions the same except for the variation in the alkyl pyridine in the primary reaction product.

EXAMPLE XI

Oxidation corrosion (rust) tests were conducted to comparatively evaluate performance of the three batches of diluted inhibtor compositions prepared according to EXAMPLE X. The testing procedure was essentially the same as that employed in Example VI, except in this case, only 200 mg/l of each of the three inhibitors were tested and the test results were compared by means of weight losses of the steel test coupons following exposure for 48 hours (2 days) to the fully oxygen saturated salt water. Table VI is a summary of the test results with the inhibitor compositions identified by the type of Alkolidine alkyl pyridine base used in their preparation as described above.

TABLE VI

| Inhibitor Base | Mg/l of Diluted Inhibitor | Coupon Weight Loss Mg/2 Days | % Inhibition* | MPY |
|---|---|---|---|---|
| None (untreated control) | | 22 | | 12.5 |
| Akolidine 10 | 200 | 8 | 64 | 5.0 |
| Akolidine 11 | 200 | 6 | 73 | 3.4 |
| Akolidine 12 | 200 | 6 | 73 | 3.4 |

*Percent reduction in corrosion loss compared to control

The inhibition values obtained in these short term tests using steel exposed to oxygen saturated salt brine are considered good and acceptable and comparable to results obtained with commercial rust inhibitors under similar test conditions. The test data illustrate the operability of a wide range of alkyl pyridine bases for purposes of this invention.

EXAMPLE XII

To illustrate the operability of aldehydes other than formaldehyde which are characterized by the absence of an alpha hydrogen atom adjacent to the —CHO aldehyde group, a series of experiments were performed using furfural. Previous tests had demonstrated that aldehydes such as acetaldehyde ($CH_3CHO$) are essentially inoperable for purposes of this invention.

Two batches of inhibitor composition were prepared using furfural as the aldehyde. In each case, 19.0 grams of Akolidine 12 were blended with 9.7 grams of AR grade (99%) pure furfural (approximately 1/10 mole of each). One blend (Case 1) was then reacted with 23.0 grams of CME IS 32A in the manner previously described. The other blend (Case 2) was separately reacted with 20.0 grams of Monsanto Dequest 2000 which is a 50% active aqueous solution of aminotrimethylene phosphonic acid. Thus, the two products (Case 1 and 2) differeed only in the type of phosphonic acid employed.

The product (Case 1) utilizing CME IS 32A reacted vigorously on addition of the phosphonic acid to the blend of alkyl pyridine and furfural and the temperature rise was from 68° F. to 130° F. resulting in a final product which was homogeneous, bright and viscous.

In Case 2, utilizing Dequest 2000 as the phosphonic acid, the exothermic reaction was somewhat less vigorous, producing a temperature increase from 68° F. to 105° F. To insure complete reaction, 3.7 grams of 115% polyphosphoric acid were added as an additional source of phosphorus acid producing a final total roughly equivalent to 1/10 mole calculated as —$H_2PO_3$. On addition of the phosphoric acid, a second exotherm occurred producing a maximum temperature of 125° F. and the final product became visibly bright and homogeneous.

Both furfural based products were diluted with a water/methanol mixture and Surfonic N95 dispersant solubilizer was added to produce a clear, stable field strength inhibitor solution according to the procedure and proportions set out in Examples IV and V.

Both final products were then subjected to corrosion and scale inhibition performance tests to demonstrate effectiveness as compositions of the present invention.

The oxygen corrosion inhibition evaluation tests were performed as described in Example XI and the test data are tabulated in Table VII.

TABLE VII

| Inhibitor Base | Mg/L of Diluted Inhibitor | Coupon Weight Loss Mg/2 Days | % Inhibition |
|---|---|---|---|
| None (untreated control) | — | 21 | — |
| Case 1 (furfural, Akolidine 12 and CME IS 32A) | 200 | 8 | 63 |
| Case 2 (furfural, Akolidine 12 and Dequest 2000 plus 115% polyphosphoric) | 200 | 9 | 55 |

In a procedure analogous to that of EXAMPLE IX scale inhibition performance tests were run with both products with the exception that calcium carbonate scale inhibition only was evaluated. Results are reflected in TABLE VIII.

TABLE VIII

| Inhibitor Base | Inhibitor Conc. Mg/L | Wt. of $CaCO_3$ ppt. from 200 ml test soln. | % Inhibition |
|---|---|---|---|
| None (untreated control) | — | 0.1187 g (av. 2 runs) | — |
| Case 1 | 10 | 0.0167 (av 2 runs) | 86 |
| Case 2 | 10 | 0.0062 (av 2 runs) | 95 |

In a procedure analogous to that described in Example VII, sulfide ($H_2S$) corrosion inhibition performance tests were run with the Case 1 product made with furfural, Akolidine 12 and CME IS 32A, with the exception that no sodium sulfite ($NaSO_3$) oxygen scavenger was added during preparation of the sulfide test brine. Thus, in the final test brine, both dissolved $O_2$ and $H_2S$ were present. Test results are summarized in Table IX.

TABLE IX

| Inhibitor Base | Inhibitor Conc. Mg/L | Weight of Steel Test Coupon Before | Weight of Steel Test Coupon After | % Inhibitor | Rate of Corrosion MPY |
|---|---|---|---|---|---|
| None (untreated control) | — | 4.5323 | 4.4955 | — | 8.7 |
| Case 1 (furfural, Akolidine 12 and CME IS 32A) | 20 | 4.5446 | 4.5403 | 88 | 1.0 |
| Case 2 | 50 | 4.4435 | 4.4412 | 94 | 0.5 |

The data of this example demonstrate that furfural is an operable source of aldehyde for the compositions according to the present invention. The data further show that inhibitor products made according to the invention are highly effective for control of both scale precipitation and mitigation of aqueous corrosion by oxygen, hydrogen sulfide and mixtures thereof. The properties of the compositions can be varied for particular application needs as illustrated by scale inhibition test results obtained with the two types of phosphonic acids used in this test series. An inhibitor of this invention made with CME IS 32A phosphonic acid is highly effective (comparable to commercial scale inhibitors) against $CaSO_4$ gypsum scale (see Example IX). An inhibitor of this invention made with Dequest 2000 phosphonic acid is highly effective against $CaCO_3$ as shown in the data of Table VIII.

The heterocyclic nitrogen containing compounds that are useful in the present invention are viewed broadly as including any 5 to 10 member single or dual ring compounds that contain at least one tertiary amine nitrogen in at least one of the rings and which as 0 to 6 alkyl side chain substituents in which there are 1 to about 6 carbon atoms per side chain. More specifically, the alkyl substituted pyridines, alkyl substituted pyrimidines, alkyl substituted imidazoles, alkyl substituted imidazolines and mixtures thereof and quinoline, quinaldine and mixtures thereof are useful for purposes of this invention. Preferably, the nitrogen containing heterocyclic compounds are alkyl substituted pyridines and mixtures thereof. In particular, the commercially available mixtures of alkyl substituted pyridines produced as by-products streams in the synthesis of other relatively pure pyridine bases (e.g., the Akolidine compositions produced as a by-product stream in the production of 2-methyl-5-ethyl pyridine as previously exemplified) are particularly preferred from a cost analysis. However, the relatively pure pyridine bases (e.g., 2-methyl-5-ethyl pyridine) are also operative and should be considered equivalent for purposes of this invention.

Thus, the nitrogen containing compounds according to the present invention would include such compounds as:
2-methyl-5-ethyl pyridine
5-(transbutenyl-2)-2-picoline
3,5-diethyl-2-picoline
3-ethyl-4-methyl-pyridine
5-ethyl-2-methyl-pyridine
2-(propenyl-1)-5-ethyl-pyridine
5-(30aza-pentyl)-2-picoline
2-picoline
3-picoline
4-picoline The phosphorus acid constituents that are viewed as being useful in the present invention include broadly any higher phosphorus oxy acid or their precursors (acid anhydrides) as well known in the art that either contain for form in situ phosphorus in the V oxidation state. Thus, the present invention contemplates the use of so-called phosphoric acid compounds such as orthophosphoric acid ($H_3PO_4$) and polyphosphoric acid (solution of $P_2O_5$ in $H_3PO_4$), acid anhydrides $P_2O_5$ ($P_4O_{10}$) and the like. Another particularly preferred class of phosphorus acid constituents useful in the present invention are the so-called phosphonic acids (organic compounds containing terminal —$H_2PO_3$ groups) and more specifically, the acid form of amino methylenephosphonic compounds wherein multiple (2 or 3) methylenephosphonic acid groups are attached to each of one or more nitrogen (amino) groups. The latter class of phosphorus acids include such compounds as amino pentamethylene phosphonic acid, amino trimethylenephosphonic acid, ethylenediamine tetramethylenephosphonic acid, hexamethylenediamine tetramethylenephosphonic acid and the like. Also included as operable phosphorus acids for purposes of the present invention are the free acid forms of esters created by reaction of phosphoric acid, polyphosphoric acid, or $P_2O_5$ with compounds containing reactive hydroxyl groups. Preferably, classes of the phosphate esters of amino alcohols, phosphate esters of water soluble alkanol amines, and phosphate esters of ethoxylated amines or amides such as urea and mixtures thereof.

When any of the organic phosphorus acids are employed, small amounts, i.e., fractions of a mole per mole of heterocyclic tertiary amine, of other strong acids may be present to promote rapid exothermic reaction of the amine, aldehyde and phosphorus acid constituent. This is particularly desirable when the phosphorus acid or acid ester is added in the form of an alkali metal or ammonium salt. Suitable strong acids for this purpose are hydrochloric acid, sulfamic, alkyl or aryl sulfonic acid, or preferably, orthophosphoric acid or $P_2O_5$.

The organic aldehydes useful in the present invention are preferably aldehydes characterized by the absence of an α-hydrogen to the aldehyde group. Thus, aldehydes useful in the present invention would include, for example, but not limited thereto, formaldehyde, benzaldehyde, and furfural. For purposes of this invention, formaldehyde is particularly preferred.

The reaction products will in general exhibit substantial water solubility depending on the specific reactants and degree of polymerization. Preferred diluents are water, methyl alcohol, ethyl alcohol or mixtures thereof. A dispersant solubilizer, preferably a nonionic surfactant consisting of an ethoxylated higher ($C_6$ or higher) alcohol, ethoxylated fatty ($C_{12}$ or higher) acid, or ethoxylated alkyl ($C_{8-C10}$) substituted phenol or mixtures is added as needed to achieve clarity of the principal reaction product in water solution.

Having thus described and exemplified the present invention with a certain degree of particularity, it is to be understood that the invention is not limited to the embodiments set forth herein for purposes of exemplification, but is to be limited only by the scope of the attached claims, including a full range of equivalents to which each element thereof is entitled.

I claim:
1. A combination corrosion and scale inhibitor composition comprising the reaction product of:
   (a) a heterocyclic nitrogen containing compound selected from the group consisting of alkyl substituted pyridine, alkyl substituted pyrimidine, alkyl substituted imidazole, alkyl substituted imidazoline, quinoline, quinaldine and mixtures thereof, wherein the alkyl substitution comprises at least one alkyl group of one to about six carbon atoms;
   (b) an aldehyde selected from the group consisting of formaldehyde, benzaldehyde, furfural and mixtures thereof; and
   (c) a phosphorus acid constituent selected from the group consisting of phosphoric acid, polyphosphoric acid, $P_2O_5$, phosphonic acid, acidic phosphate esters of amino alcohols, ethoxylated amines, and alkanol amines and mixtures thereof.

2. A composition of claim 1 wherein the heterocyclic nitrogen containing compound is an alkyl substituted pyridine or mixtures thereof and the aldehyde is formaldehyde.

3. A composition of claim 2 wherein at least about one mole of aldehyde and about one mole of phosphoric acid constituent is reacted per mole of pyridine.

4. A composition of claim 2 wherein the phosphoric acid constituent is phosphoric acid.

5. A composition of claim 2 wherein the phosphoric acid constituent is hexamethylenediamine tetramethylenephosphonic acid.

6. A composition of claim 2 wherein the phosphoric acid constituent is ethylenediamine tetramethylenephosphonic acid.

7. A composition of claim 2 wherein the phosphoric acid constituent is amino trimethylenephosphonic acid.

8. A composition of claim 1 further comprising a strong acid constituent selected from the group consisting of hydrochloric, sulfamic, alkyl or aryl sulfonic and orthophosphoric acid.

9. A composition of claim 2 further comprising a strong acid constituent selected from the group consisting of hydrochloric, sulfamic, alkyl or aryl sulfonic and orthophosphoric acid.

10. In a process for retarding, in an aqueous media, one or more of the following: oxidation corrosion, hydrogen sulfide corrosion, cargon dioxide corrosion and mineral scaling, the specific improvement comprising the step of:

treating the acqueous media with an effective amount of the reaction product of (a) a heterocyclic nitrogen containing compound selected from the group consisting of alkyl substituted pyridine, alkyl substituted pyrimidine, alkyl substituted imidazole, alkyl substitute imidazoline, quinoline, quinaldine and mixtures thereof, wherein the alkyl substitution comprises at least one alkyl group of one to about six carbon atoms; (b) an aldehyde selected from the group consisting of formaldehyde, benzaldehyde, furfural and mixtures thereof; and (c) a phosphorus acid constituent selected from the group consisting of phosphoric acid, polyphosphoric acid $P_2O_5$, phosphonic acid, acidic phosphate esters of amino alcohols, ethoxylated amines, and alkanol amines and mixtures thereof.

* * * * *

UNITED STATES PATENT AND TRADEMARK OFFICE
CERTIFICATE OF CORRECTION

PATENT NO. : 4,554,090

DATED : November 19, 1985

INVENTOR(S) : Loyd W. Jones

It is certified that error appears in the above-identified patent and that said Letters Patent are hereby corrected as shown below:

Column 1, line 45, the word "effected" should read --affected--.
Column 2, line 31, the word "euqals" should read --equals--.
Column 2, line 51, after the phrase "carbon dioxide" insert --corrosion--. Column 2, line 53, the word "synthexizing" should read --synthesizing--. Column 3, line 34; Column 4, lines 17 and 48; Column 5, line 6, and Column 9, lines 8 and 41, the word "Alkolidine", each occurrence, should read --Akolidine-- Column 7, line 1 of TABLE V, the formula "CaCO$_4$" should read --CaSO$_4$--. Column 8, line 19, the word "alky" should read --alkyl-- Column 9, line 48, the word "differeed" should read --differed--. Column 10, line 49 of TABLE IX, the header "% Inhibitor" should read --% Inhibition--. Column 11, line 10, the word "as" should read --has--. Column 11, line 38, the portion of the formula reading "30aza" should read --3 aza--. Column 12, line 62 of Claim 3; line 64 of Claim 4 and line 66 of Claim 5; Column 13, line 1 of Claim 6 and line 5 of Claim 7, the expression "phosphoric acid constituent", each occurrence, should read --phosphorus acid constituent--.

Signed and Sealed this

Third Day of June 1986

[SEAL]

Attest:

DONALD J. QUIGG

Attesting Officer

Commissioner of Patents and Trademarks